United States Patent
Morimitsu

(10) Patent No.: US 8,160,301 B2
(45) Date of Patent: Apr. 17, 2012

(54) VEHICLE SURROUNDINGS MONITORING APPARATUS

(75) Inventor: Noboru Morimitsu, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 751 days.

(21) Appl. No.: 12/352,909

(22) Filed: Jan. 13, 2009

(65) Prior Publication Data
US 2009/0187308 A1 Jul. 23, 2009

(30) Foreign Application Priority Data

Jan. 18, 2008 (JP) ................. 2008-009563

(51) Int. Cl.
*G06K 9/00* (2006.01)
*G01C 17/38* (2006.01)

(52) U.S. Cl. ............................ 382/106; 382/274; 702/96

(58) Field of Classification Search .................. 382/100, 382/103–107, 154, 155, 162, 168, 172, 173, 382/181, 190, 193–194, 199, 209, 224, 232, 382/254, 260, 274, 276, 286–292, 305, 312, 382/317, 321; 702/181, 96; 367/6
See application file for complete search history.

(56) References Cited

U.S. PATENT DOCUMENTS

| 6,385,334 | B1* | 5/2002 | Saneyoshi et al. | 382/154 |
| 6,449,383 | B1* | 9/2002 | Oike et al. | 382/104 |
| 6,591,000 | B1* | 7/2003 | Oike et al. | 382/104 |
| 6,674,687 | B2* | 1/2004 | Zeitzew | 367/6 |
| 6,813,370 | B1* | 11/2004 | Arai | 382/104 |
| 6,985,619 | B1* | 1/2006 | Seta et al. | 382/154 |
| 6,999,896 | B2* | 2/2006 | Takahashi | 702/181 |

FOREIGN PATENT DOCUMENTS
JP 2001-067484 3/2001
* cited by examiner

*Primary Examiner* — Seyed Azarian
(74) *Attorney, Agent, or Firm* — Smith, Gambrell & Russell, LLP

(57) ABSTRACT

In a stereo-image recognition apparatus, pixel blocks having correlation with the brightness characteristics of target pixel blocks extracted from a reference image of a stereo image are specified in a comparative image so as to calculate parallaxes of the pixel blocks. Further, distance-data calculation pixel blocks whose distance data is to be calculated are extracted from the pixel blocks whose parallaxes are calculated, and parallaxes of the extracted distance-data calculation pixel blocks are calculated as distance data, thus monitoring vehicle surroundings. A brightness-determination-threshold setting unit variably sets a brightness determination threshold value on the basis of the distance distribution of the calculated distance data of the distance-data calculation pixel blocks so as to control the sensitivity to extract the distance-data calculation pixel blocks and to enhance the accuracy in monitoring vehicle surroundings.

4 Claims, 4 Drawing Sheets

VEHICLE SURROUNDINGS MONITORING APPARATUS

CROSS-REFERENCE TO RELATED APPLICATIONS

The disclosure of Japanese Patent Application No. 2008-009563 filed on Jan. 18, 2008 including the specification, drawings and abstract is incorporated herein by reference in its entirety.

BACKGROUND OF THE INVENTION

1. Field of the Invention

The present invention relates to a vehicle surroundings monitoring apparatus that monitors vehicle surroundings on the basis of distance data calculated from a pair of stereo images.

2. Description of the Related Art

In recent years, stereo-type vehicle surroundings monitoring apparatuses, which use a pair of vehicle-mounted cameras (stereo cameras) each incorporating a solid-state image pickup element such as a CCD, have attracted attention. In order to recognize vehicle surroundings with these vehicle surroundings monitoring apparatuses, first, a pixel block having correlation with each pixel block in one image is specified in the other image (stereo matching), and a parallax is calculated as a relative displacement amount between the pixel blocks. Distance data is calculated from parallaxes, which are obtained for pixel blocks, according to the principle of triangulation. By subjecting the distance data to known grouping, objects (for example, white lines and vehicles in the vehicle surroundings) are recognized in the taken image.

In this distance measuring technique, it is important to verify edge states of stereo-matched pixel blocks in order to enhance reliability of parallaxes calculated for the pixel blocks. One verification method is to evaluate the amount of change in brightness in the lateral direction (horizontal direction) of the pixel block. In this verification method, for example, the amount of change in brightness between pairs of pixels adjacent in the horizontal direction in a certain matched pixel block is compared with a predetermined brightness determination threshold value, and the number of pairs of pixels, in which an amount of change in brightness is more than or equal to the threshold value, is counted. Parallaxes of pixel blocks, in which the counted number is more than or equal to a predetermined number, are output as distance data, and parallaxes of pixel blocks, in which the counted number is less than predetermined number, are removed because of their low reliability.

Japanese Unexamined Patent Application Publication No. 2001-67484 discloses a vehicle surroundings monitoring apparatus in which the number of distance data that varies according to a surrounding environment of the vehicle is optimized. In the vehicle surrounding monitoring apparatus disclosed in this publication, a brightness determination threshold value is adjusted in accordance with the number of distance data that is calculated by comparing the amounts of change in brightness between the adjacent pixels in pixel blocks with the brightness determination threshold value so as to specify pixel blocks in which the amount of change in brightness is large.

Unfortunately, in a case in which the brightness determination threshold value is uniformly increased and decreased on the basis of the number of distance data, as in the above publication, for example, when the brightness determination threshold value is adjusted to a low value, a lot of erroneous distance data based on noise are calculated. In this case, truly necessary distance data, such as distance data on a remote vehicle, may be buried in erroneous distance data. Therefore, from this standpoint, it is preferable that the brightness determination threshold value be kept somewhat high.

On the other hand, in a case in which the brightness determination threshold value is set to be too high, for example, when a flat and patternless wall extends just in front of a subject vehicle in which the apparatus is mounted, it is difficult to calculate a trivial characteristic on the wall as distance data. In this case, accurate recognition of the wall may be impossible.

SUMMARY OF THE INVENTION

The present invention has been made in view of the above-described circumstances, and it is an object of the present invention to provide a vehicle surroundings monitoring apparatus that can enhance the accuracy in monitoring the surroundings of a vehicle by properly setting the distance-data calculation sensitivity in accordance with an environment outside the vehicle.

A vehicle surroundings monitoring apparatus according to an aspect of the present invention monitors a condition outside a vehicle by calculating distance data on pixel blocks each including a plurality of pixels, on the basis of a pair of images of an object outside the vehicle. The vehicle surroundings monitoring apparatus includes parallax calculation means for calculating parallaxes of target pixel blocks in one of the images by specifying correlated pixel blocks in the other image, the correlated pixel blocks having correlation with brightness characteristics of the target pixel blocks; distance-data calculation pixel-block extracting means for extracting distance-data calculation pixel blocks whose distance data is to be calculated, from the target pixel blocks whose parallaxes are calculated, and for calculating, as distance data in the extracted distance-data calculation pixel blocks, parallaxes of the distance-data calculation pixel blocks; and sensitivity control means for controlling sensitivity with which the distance-data calculation pixel-block extracting means extracts the distance-data calculation pixel-blocks, on the basis of a distance distribution of the calculated distance data of the distance-data calculation pixel blocks.

According to the vehicle surroundings monitoring apparatus of the present invention, it is possible to enhance the accuracy in monitoring vehicle surroundings by properly setting the distance-data calculation sensitivity in accordance with an environment outside the vehicle.

DESCRIPTION OF THE PREFERRED EMBODIMENTS

An embodiment of the present invention will be described below with reference to the drawings.

Figure 1:
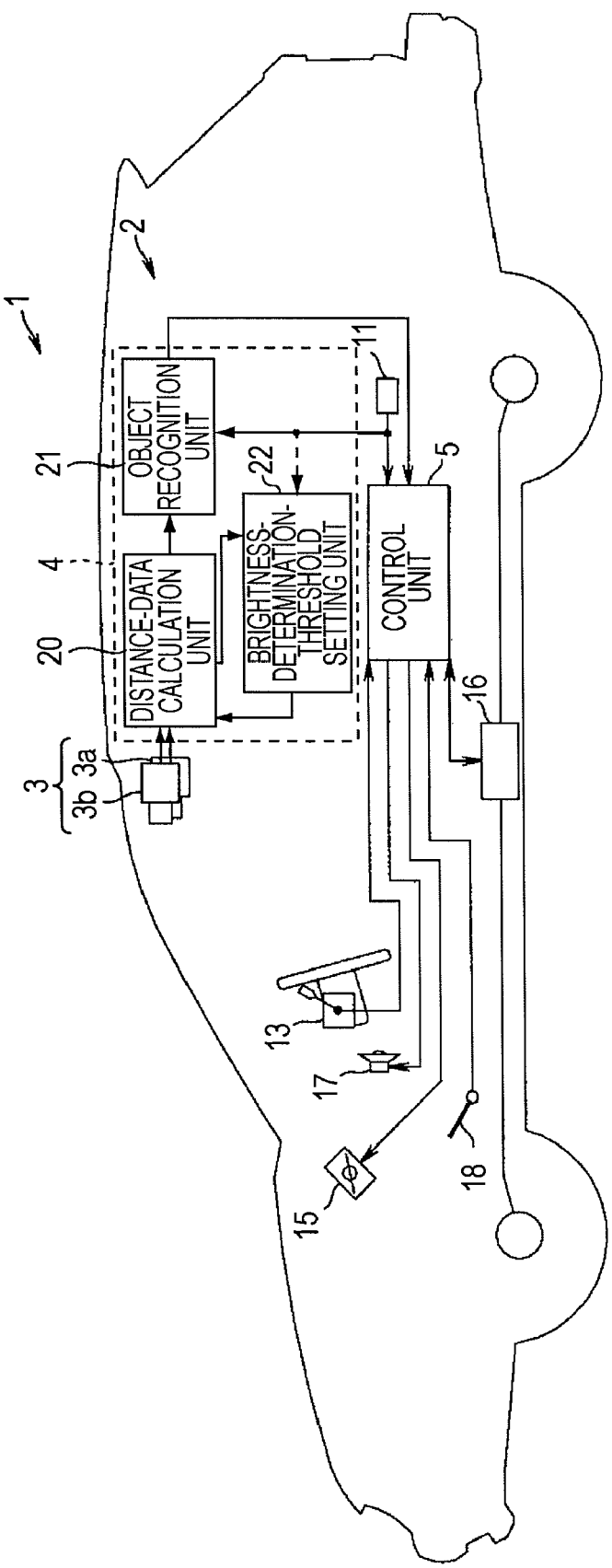
FIG. 1 is a schematic structural view of a vehicle drive assist system.

Referring to FIG. 1, a vehicle drive assist system 2 is installed in a vehicle (subject vehicle) 1 such as a car. The drive assist system 2 mainly includes a stereo camera 3, a stereo-image recognition apparatus 4, and a control unit 5.

The vehicle 1 also includes a vehicle-speed sensor 11 for detecting a subject vehicle speed V, and a main switch 13 from which ON and OFF signals of drive assist control are input. The subject vehicle speed V and the ON and OFF signals of drive assist control are input to the control unit 5.

The stereo camera 3 includes a pair of right and left CCD cameras 3a and 3b each using a solid-state image pickup element, such as a charge coupled device (CCD), as a stereo optical system. The CCD cameras 3a and 3b are spaced a fixed distance apart on the front of a ceiling in the vehicle interior, and take stereo images of objects outside the vehicle 1 from different viewpoints. In this embodiment, the camera 3a is mounted as a main camera on the right as the vehicle 1 travels, and outputs a reference image. In contrast, the camera 3b is mounted as a sub-camera on the left as the vehicle 1 travels, and outputs a comparative image.

The stereo-image recognition apparatus 4 serves as a vehicle surroundings monitoring apparatus, and includes a distance-data calculation unit 20 and an object recognition unit 21.

Figure 2A:
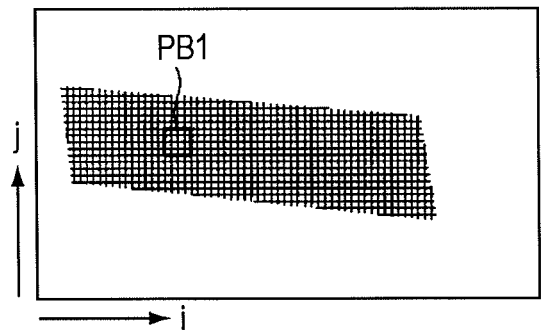
FIGS. 2A and 2B explain a reference image and a comparative image, respectively.
Figure 2B:
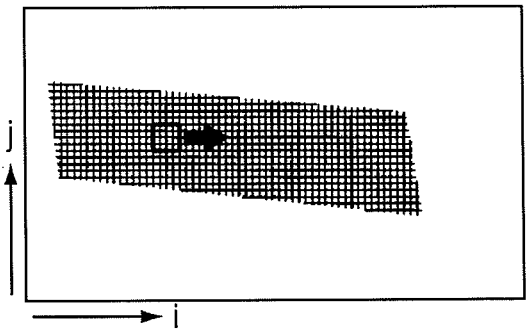

The distance-data calculation unit 20 calculates distance data on pixel blocks, for example, each being defined by 4 by 4 pixels, on the basis of reference image data and comparative image data input from the stereo camera 3. More specifically, the distance-data calculation unit 20 extracts one pixel block PB1 from the reference image data, and searches for and specifies a pixel block in the comparative image data that has correlation with the brightness characteristic of the pixel block PB1 (see FIGS. 2A and 2B). As is well known, the distance between objects shown in stereo images appears as a parallax in the stereo images, that is, as an amount of horizontal displacement of the position between the reference image and the comparative image. Therefore, in order to specify a pixel block having correlation with the target pixel block PB1, pixel blocks on a horizontal line (epipolar line) having the same j coordinate as that of the target pixel block PB1 are searched for in the comparative image data. The distance-data calculation unit 20 shifts the pixel one by one on the epipolar line, and evaluates correlations of all comparative pixel blocks in a predetermined pixel region on the epipolar line. Then, the distance-data calculation unit 20 finds a parallax between the pixel block PB1 in the reference image, and the specified pixel block in the comparative image having correlation with the pixel block PB1.

Figure 3:
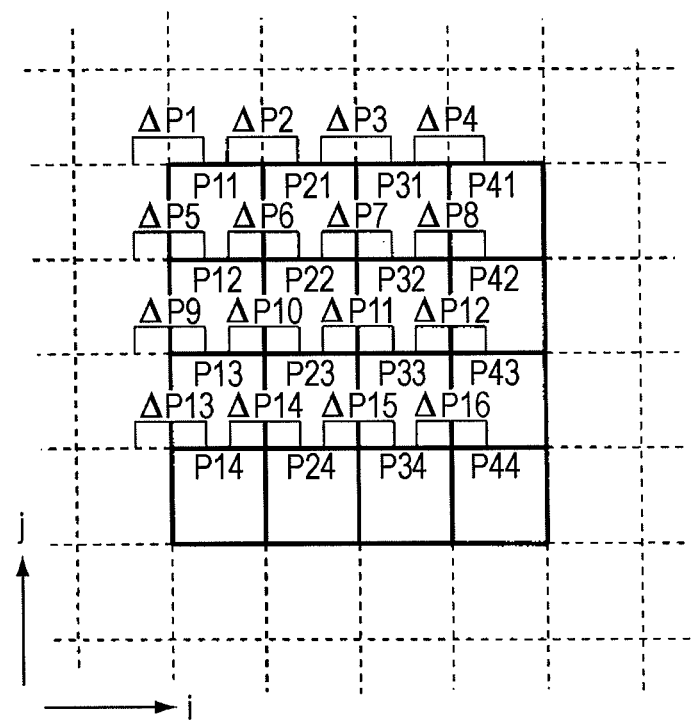
FIG. 3 explains a method for evaluating a horizontal brightness edge in a pixel block.
Figure 7:
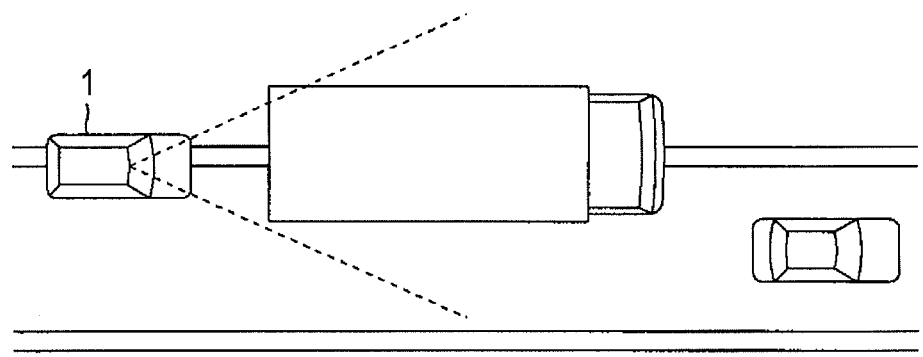
FIG. 7 explains an example of an environment outside the vehicle.
Figure 8:
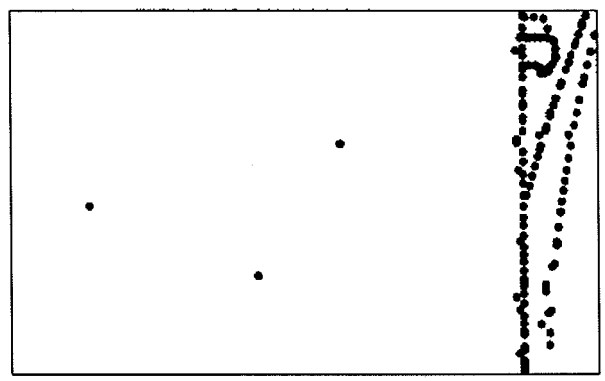
FIG. 8 explains an example of a distance image.

Further, the distance-data calculation unit 20 evaluates a horizontal brightness edge (amount of change in brightness) of the pixel block with reference to the reference image data, and thereby subjects the parallax calculated by stereo matching to filtering. More specifically, for example, the distance-data calculation unit 20 calculates brightness change amounts (absolute values) $\Delta Pn$ ($1 \leq n \leq 16$) between pairs of pixels adjacent in the horizontal direction in each pixel block serving as a unit for calculation of distance data, as shown in FIG. 3. As for pixels (P11, P12, P13, P14) in the leftmost column, brightness change amounts $\Delta P$ from pixels in the rightmost column of a pixel block adjacent on the left side are calculated. Then, the distance-data calculation unit 20 counts the number of brightness change amounts $\Delta Pn$ more than or equal to a brightness determination threshold value DCDXth, of sixteen brightness change amounts $\Delta Pn$. The distance-data calculation unit 20 extracts pixel blocks in which the brightness change amount is large, by removing parallaxes regarding pixel blocks in which the counted number is less than a set value (for example, four), and outputs, as distance data, only parallaxes regarding the extracted pixel blocks. The extracted pixel blocks serve as distance-data calculation pixel blocks. In other words, reliability of the parallax is often low in pixel blocks in which the brightness change amount in the horizontal direction is small and which have no outstanding brightness characteristic, even when the pixel blocks are matched in stereo matching. Thus, the parallaxes calculated for such pixel blocks are removed to enhance reliability of distance data. By these operations, for example, an image (distance image) is obtained from a distribution of pixel blocks having distance data, as shown in FIG. 8. The distance image shown in FIG. 8 is obtained, for example, on the basis of a pair of stereo images of an environment in front of the subject vehicle 1 that is parked parallel behind a large truck, as shown in FIG. 7.

In this embodiment, the distance-data calculation unit 20 thus functions as parallax calculation means and pixel-block extracting means.

The object recognition unit 21 subjects distance data on the pixel blocks, which are calculated by the distance-data calculation unit 20, to known grouping. For example, frames (windows) of three-dimensional road shape data, side-wall data, and three-dimensional object data are preset and stored in the object recognition unit 21. The object recognition unit 21 compares the groups of distance data with the windows, and thereby extracts white line data and side wall data on guardrails and curbs extending along the road. Also, the object recognition unit 21 extracts objects in various types of three-dimensional objects such as a two-wheel vehicle, a standard-size vehicle, a large-size vehicle, a pedestrian, and a utility pole.

Further, the object recognition unit 21 estimates a subject-vehicle traveling lane on the basis of information about the recognized white lines and side walls, and performs an operation of detecting (capturing, checking exit) a preceding vehicle on the estimated subject-vehicle traveling lane. In other words, when three-dimensional objects having a velocity component more than or equal to a predetermined value in the same direction as the subject-vehicle traveling direction (forward-direction moving objects) exist on the subject-vehicle traveling lane, a forward-direction moving object closest to the subject vehicle is detected (captured) as a preceding vehicle from the objects, and various preceding-vehicle information (e.g., inter-vehicle distance Dnow, preceding vehicle speed Vfwd, and preceding vehicle deceleration Gfwd) is acquired. In contrast, when no forward-direction moving object exists on the subject-vehicle traveling lane, it is determined that the preceding vehicle has been lost (or has exited) from the subject-vehicle traveling lane.

The control unit 5 performs, for example, adaptive cruse control (ACC) as drive assist control according to the information about the vehicle surroundings recognized by the stereo-image recognition apparatus 4. For example, a subject vehicle speed V is input from the vehicle-speed sensor 11 to the control unit 5, and a set vehicle speed Vset for constant-speed running is also input thereto from various switches attached to the main switch 13.

In a state in which the main switch 13 is ON, the control unit 5 sets a set vehicle speed Vset, which is set by the driver, as a target vehicle speed Vtrgt during constant-speed running control performed when no preceding vehicle is detected, and controls the opening of an electronic control throttle valve 15 (engine output control) so that the subject vehicle speed V converges to the target vehicle speed Vtrgt. When the control unit 5 determines that a sufficient deceleration cannot be obtained only by engine output control, it also uses control of liquid pressure output from an active booster 16 (automatic brake intervention control) so that the subject vehicle speed V converges to the target vehicle speed Vtrgt.

When a preceding vehicle is detected on the subject-vehicle traveling lane during constant-speed running control, the control unit 5 switches running control to follow-up running control. In follow-up running control, the control unit 5 sets a target vehicle speed Vtrgt on the basis of a follow-up target inter-vehicle distance Dtuiju that will be described below, and controls the opening of the electronic control throttle valve 15 (engine output control) so that the inter-vehicle distance Dnow converges to the follow-up target inter-vehicle distance Dtuiju. Further, when the control unit 5 determines that a sufficient deceleration cannot be obtained only by engine output control, it also uses control of liquid pressure output from the active booster 16 (automatic brake intervention control) in combination so that the inter-vehicle distance Dnow converges to the follow-up target inter-vehicle distance Dtuiju. The follow-up target inter-vehicle distance Dtuiju is set to be variable in accordance with the subject vehicle speed V. In other words, for example, a map for setting a follow-up target inter-vehicle distance is preset and stored in the control unit 5. With reference to this map, the control unit 5 sets the follow-up target inter-vehicle distance Dtuiju to increase as the subject vehicle speed V increases.

As drive assist control based on the vehicle surroundings information recognized by the stereo-image recognition apparatus 4, the control unit 5 also controls warnings against a rush of the subject vehicle 1 caused, for example, when an accelerator pedal 18 is improperly pressed to start moving the vehicle. More specifically, for example, when the driver erroneously presses the accelerator pedal 18 hard to start moving the subject vehicle 1 although an obstacle is recognized as being just in front of the subject vehicle 1, the control unit 5 reduces the opening of the electronic control throttle valve 15 more than usual. This prevents sudden acceleration of the subject vehicle 1. Moreover, a warning against the forward obstacle is given via a speaker 17.

In general, this type of warning control is effective particularly when the vehicle is started immediately after the ignition key is turned on. On the other hand, since the drive assist system 2 (stereo-image recognition apparatus 4) is restarted immediately after the ignition key is turned on, it is impossible to continuously recognize an obstacle just in front of the subject vehicle 1 from afar, unlike during normal running. Therefore, for example, when a substantially patternless wall exists over almost the entire area just in front of the subject vehicle 1, it is sometimes difficult to accurately recognize the wall. This situation is supposable, for example, when the subject vehicle 1 is parked parallel behind a large truck, as shown in FIG. 7, or when the subject vehicle 1 is parked in a manner such as to directly face a wall of a building.

In order to accurately recognize the wall or the like even in this situation, the stereo-image recognition apparatus 4 also includes a brightness-determination-threshold setting unit 22. The brightness-determination-threshold setting unit 22 variably sets a brightness determination threshold value DCDXth on the basis of the distribution (distance distribution) of distance data calculated by the distance-data calculation unit 20. With this, the brightness-determination-threshold setting unit 22 controls the sensitivity to extract pixel blocks by filtering in the distance-data calculation unit 20.

More specifically, for example, the brightness-determination-threshold setting unit 22 selectively sets one of a first brightness determination threshold value DCDX1 and a second brightness determination threshold value DCDX2, as the brightness determination threshold value DCDXth.

In this embodiment, a first brightness determination threshold value DCDX1 is a basic brightness determination threshold value in distance-data calculation. DCDX1 is tuned to a value such that a pixel block having low reliability (for example, a pixel block whose parallax has been calculated on the basis of noise in the image) can be reliably removed by filtering during driving of the subject vehicle 1. A second brightness determination threshold value DCDX2 is lower than the first brightness determination threshold value DCDX1. In particular, the second brightness determination threshold value DCDX2 is tuned to a value such that even a pixel block whose parallax has been calculated on the basis of fine irregularities and patterns existing near the subject vehicle 1 can be reliably extracted without being removed by filtering.

Figure 4:
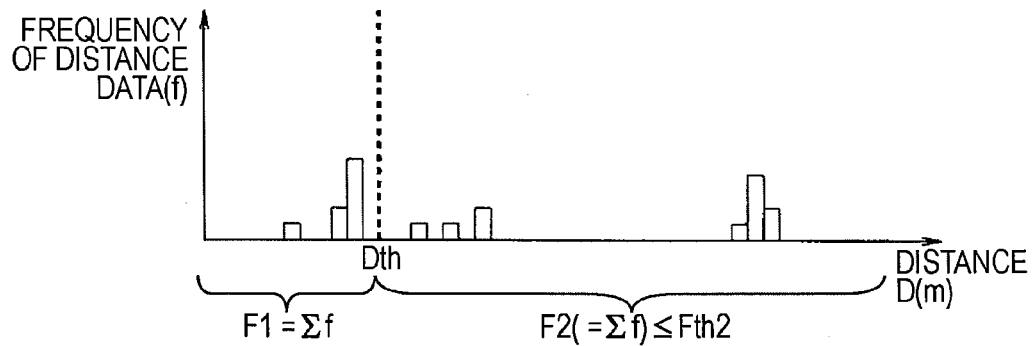
FIG. 4 is a chart showing an example of a distribution of distance data in the pixel block.

Basically, the brightness-determination-threshold setting unit 22 sets a brightness determination threshold value DCDXth on the basis of the number F2 of pixel blocks having distance data farther than a preset distance Dth (e.g., 5 m). In other words, when the number F2 of pixel blocks having distance data farther than the preset distance Dth is less than or equal to a set threshold value Fth2 (for example, see FIG. 4), it is supposable that an image of a remote object cannot be taken by the stereo camera 3 because the object is blocked by an obstacle existing just in front of the subject vehicle 1. Thus, the brightness-determination-threshold setting unit 22 sets a second brightness determination threshold value DCDX2 as the brightness determination threshold value DCDXth. This enhances the sensitivity to extract pixel blocks during filtering by the distance-data calculation unit 20. If a patternless wall extends just in front of the subject vehicle 1, the wall can be recognized reliably.

Figure 5:
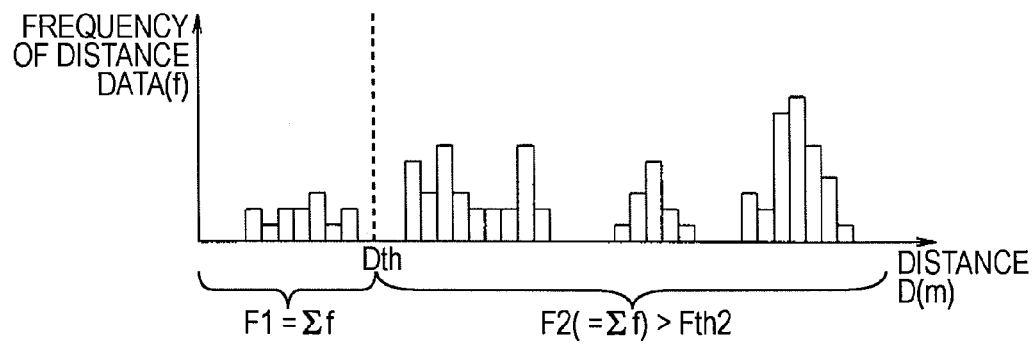
FIG. 5 is a chart showing an example of a distribution of distance data in the pixel block.

In contrast, when the number F2 of pixel blocks having distance data farther than the preset distance Dth is more than the set threshold value Fth2 (for example, see FIG. 5), it is supposable that an image of an obstacle remote from the subject vehicle 1 can be sufficiently taken by the stereo camera 3. Accordingly, the brightness-determination-threshold setting unit 22 sets a first brightness determination threshold value DCDX1 as the brightness determination threshold value DCDXth. With this, pixel blocks having low reliability are removed, and even an obstacle remote from the subject vehicle 1 can be recognized accurately.

Figure 6:
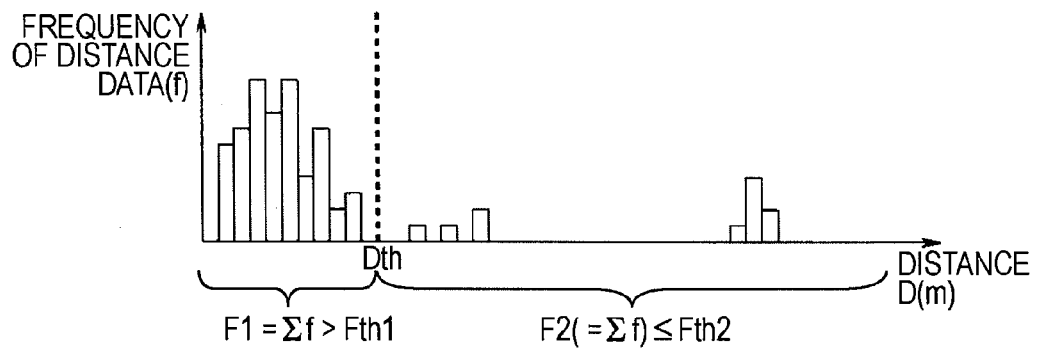
FIG. 6 is a chart showing an example of a distribution of distance data in the pixel block.

For example, as shown in FIG. 6, even if the number F2 of pixel blocks having distance data farther than the preset distance Dth is less than or equal to the set threshold value Fth2, when the number F1 of pixel blocks having distance data closer than the distance Dth is more than a set threshold value Fth1, an obstacle existing just in front of the subject vehicle 1 can be recognized reliably. In this case, by way of exception, it is preferable to prohibit the brightness determination threshold value DCDXth from being changed to a second brightness determination threshold value DCDX2, and to keep the first brightness determination threshold value DCDX1, which serves as the basic brightness determination threshold value, as the brightness determination threshold value DCDXth.

When the subject vehicle 1 is traveling at a speed more than or equal to a set vehicle speed (e.g., 5 Km/h), even if a patternless wall extends just in front of the subject vehicle 1, there is a high probability that the wall has been continuously recognized from afar (from a long distance that allows sufficient edge detection). The wall that has been thus continuously recognized can be sufficiently recognized even if the number F1 of pixel blocks having distance data when the subject vehicle 1 reaches the front of the wall is less than or equal to the set threshold value Fth1. Thus, in this case, by way of exception, it is preferable to prohibit the brightness determination threshold value DCDXth from being changed to a second brightness determination threshold value DCDX2, and to keep the first brightness determination threshold value DCDX1, which serves as the basic brightness determination threshold value, as the brightness determination threshold value DCDXth.

Figure 9:
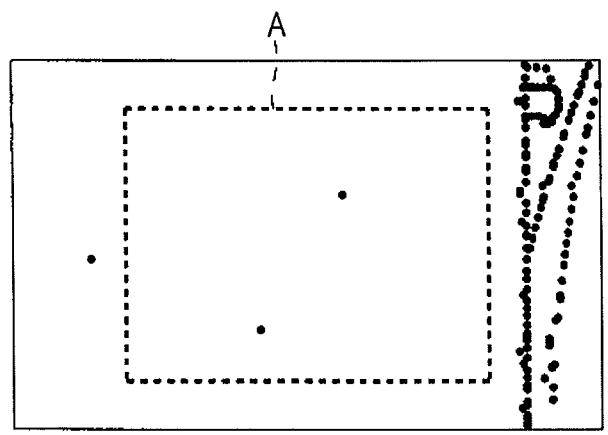
FIG. 9 explains a modification of an evaluation region for a brightness determination threshold value.

In order to reliably recognize an obstacle just in front of the subject vehicle 1, for example, it is preferable that a region in which distance data is monitored to set the brightness determination threshold value DCDXth be limited to a predetermined region A directly facing the subject vehicle 1, as shown in FIG. 9.

According to the above-described embodiment, in the stereo-image recognition apparatus 4 for monitoring vehicle surroundings, a pixel block having correlation with the brightness characteristic of each pixel block extracted from a reference image serving as a stereo image is specified in a comparative image so as to calculate parallaxes of pixel blocks. Further, pixel blocks whose distance data is to be calculated are extracted from the pixel blocks whose parallaxes have been calculated, and parallaxes of the extracted pixel blocks are calculated as distance data. The brightness-determination-threshold setting unit 22 variably sets the brightness determination threshold value DCDXth on the basis of the distance distribution of the distance data calculated for the pixel blocks so as to control the sensitivity to extract the pixel blocks whose distance data is to be calculated. This can enhance the accuracy in monitoring the vehicle surroundings.

Particularly when the number F2 of pixel blocks having distance data farther than the preset distance Dth is less than or equal to a set threshold value Fth2, the sensitivity to extract the pixel blocks is increased by setting the brightness determination threshold value DCDXth at a relatively small value (DCDX2). In this case, even when a substantially patternless wall extends just in front of the subject vehicle 1, the wall can be recognized reliably. In contrast, when the number F2 of pixel blocks having distance data farther than the preset distance Dth is more than the set threshold value Fth2, the sensitivity to extract the pixel blocks is decreased by setting the brightness determination threshold value DCDXth at a relatively large value (basic threshold value DCDX1). This allows an obstacle remote from the subject vehicle 1 to be reliably recognized without any influence of noise in the image.

While the brightness determination threshold value DCDXth is set at one of the first and second brightness determination threshold values DCDX1 and DCDX2 in the above-described embodiment, the present invention is not limited thereto. For example, it is possible to subdivide conditions and values of distribution of distance data for setting the brightness determination threshold value DCDXth.

What is claimed is:

1. A vehicle surroundings monitoring apparatus that monitors a condition outside a vehicle by calculating distance data on pixel blocks each including a plurality of pixels, on the basis of a pair of images of an object outside the vehicle, the apparatus comprising:
   parallax calculation means for calculating parallaxes of target pixel blocks in one of the images by specifying correlated pixel blocks in the other image, the correlated pixel blocks having correlation with brightness characteristics of the target pixel blocks;
   distance-data calculation pixel-block extracting means for extracting distance-data calculation pixel blocks whose distance data is to be calculated, from the target pixel blocks whose parallaxes are calculated, and for calculating, as distance data in the extracted distance-data calculation pixel blocks, parallaxes of the distance-data calculation pixel blocks; and
   sensitivity control means for controlling an extraction sensitivity with which the distance-data calculation pixel-block extracting means extracts the distance-data calculation pixel-blocks, on the basis of a distance distribution of the calculated distance data of the distance-data calculation pixel blocks,
   wherein the distance-data calculation pixel-block extracting means extracts the distance-data calculation pixel blocks by subjecting the target pixel blocks whose parallaxes are calculated, to filtering based on a determination threshold value, and
   wherein the sensitivity control means controls the extraction sensitivity by variably setting the determination threshold value on the basis of the distance distribution of the calculated distance data of the distance-data calculation pixel blocks.

2. The vehicle surroundings monitoring apparatus according to claim 1, wherein, when the number of distance-data calculation pixel blocks having distance data farther from a preset distance, of the extracted distance-data calculation pixel blocks, is less than or equal to a set number, the sensitivity control means changes the determination threshold value so as to be relatively lower than when the number of the distance-data calculation pixel blocks is more than the set number.

3. The vehicle surroundings monitoring apparatus according to claim 1, wherein, when a speed of the vehicle is more than or equal to a set vehicle speed, the sensitivity control means prohibits control that increases the extraction sensitivity.

4. The Vehicle surroundings monitoring apparatus according to claim 1, wherein the sensitivity control means prohibits increasing the extraction sensitivity when the number of distance-data calculation pixel blocks having distance data closer than a preset distance is more than a set number.

* * * * *